(12) United States Patent
Chang et al.

(10) Patent No.: US 11,105,726 B2
(45) Date of Patent: Aug. 31, 2021

(54) CALIBRATED PARTICLE ANALYSIS APPARATUS AND METHOD

(71) Applicant: Industrial Technology Research Institute, Hsinchu (TW)

(72) Inventors: Chun-Ling Chang, Taichung (TW); I-Hsiang Hsu, Kaohsiung (TW); Fang-Hsin Lin, Taichung (TW); Yi-Hung Liu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 343 days.

(21) Appl. No.: 16/249,902

(22) Filed: Jan. 17, 2019

(65) Prior Publication Data

US 2019/0219493 A1 Jul. 18, 2019

Related U.S. Application Data

(60) Provisional application No. 62/618,637, filed on Jan. 18, 2018.

(51) Int. Cl.
*G01N 15/10* (2006.01)
*G01N 15/02* (2006.01)
(Continued)

(52) U.S. Cl.
CPC ............ *G01N 15/10* (2013.01); *G01N 1/00* (2013.01); *G01N 1/38* (2013.01); *G01N 15/0205* (2013.01);
(Continued)

(58) Field of Classification Search
CPC ............ G01N 15/10; G01N 1/00; G01N 1/38; G01N 15/0266; G01N 15/065; G01N 15/0205; G01N 15/0255; G01N 2015/0038; G01N 2015/0681; G01N 2015/0053; G01N 2001/383; G01N 2015/1087; G01N 2015/1062; G01N 15/1012
See application file for complete search history.

(56) References Cited

U.S. PATENT DOCUMENTS 5,922,976 A   7/1999   Russell et al.
6,491,872 B1  12/2002  Wick
(Continued)

FOREIGN PATENT DOCUMENTS

CN      103487494      1/2014
CN      106908570      6/2017
(Continued)

OTHER PUBLICATIONS

Translation of JP-5495978-B2, Rion et al. (Year: 2014).*
(Continued)

*Primary Examiner* — Nathaniel T Woodward
(74) *Attorney, Agent, or Firm* — JCIPRNET

(57) ABSTRACT

Calibrated particle analysis apparatus and method are provided. In the calibrated particle analysis apparatus, a gas exchange device and several flow controllers are disposed in front of a particle analyzer. Therefore, when the calibrated particle analysis apparatus is used, gases of a sample can be exchanged with a carrier gas suggested to be used with the particle analyzer. Hence, the accuracy of analyzing the particles can be increased, and possible hazards from dangerous or toxic materials can be avoided.

16 Claims, 7 Drawing Sheets

(51) Int. Cl.
  *G01N 1/00* (2006.01)
  *G01N 1/38* (2006.01)
  *G01N 15/06* (2006.01)
  *G01N 15/00* (2006.01)

(52) U.S. Cl.
  CPC ..... *G01N 15/0255* (2013.01); *G01N 15/0266* (2013.01); *G01N 15/065* (2013.01); *G01N 2001/383* (2013.01); *G01N 2015/0038* (2013.01); *G01N 2015/0053* (2013.01); *G01N 2015/0681* (2013.01); *G01N 2015/1062* (2013.01); *G01N 2015/1087* (2013.01)

(56) References Cited

U.S. PATENT DOCUMENTS

| | | | |
|---|---|---|---|
| 7,586,092 | B1 | 9/2009 | Karpetsky |
| 7,867,779 | B2 * | 1/2011 | McDermott ......... G01N 1/2205 436/181 |
| 10,170,291 | B1 | 1/2019 | Hsu et al. |
| 2007/0114389 | A1 | 5/2007 | Karpetsky et al. |
| 2011/0133074 | A1 * | 6/2011 | Nakanishi ............. G01N 27/62 250/282 |
| 2018/0294149 | A1 * | 10/2018 | Rohner .................. H01J 49/14 |

FOREIGN PATENT DOCUMENTS

| | | | |
|---|---|---|---|
| EP | 1148337 | A2 * | 10/2001 ......... G01N 33/0014 |
| JP | 5495978 | | 5/2014 |
| JP | 5495978 | B2 * | 5/2014 |
| KR | 20010098708 | | 11/2001 |
| TW | 201007165 | | 2/2010 |
| TW | 201506375 | | 2/2015 |

OTHER PUBLICATIONS

"Office Action of Taiwan Counterpart Application", dated May 16, 2019, pp. 1-5.

Office Action of Korea Counterpart Application with English translation thereof, dated Mar. 1, 2020, p. 1-p. 13.

Kohei Nishiguchi,A et al.,"Real-time multielement monitoring of airborne particulate matter using ICP-MS instrument equipped with gas converter apparatus," Journal of Analytical Atomic Spectrometry, vol. 23, No. 8, Jul. 2008, pp. 1125-1129.

Nishiguchi K et al., "Gas to particle conversion-gas exchange technique for direct analysis of metal carbonyl gas by inductively coupled plasma mass spectrometry," Analytical Chemistry, vol. 86, No. 20, Oct. 2014, pp. 11925-11926.

Ohata M et al., "Direct analysis of ultra-trace semiconductor gas by inductively coupled plasma mass spectrometry coupled with gas to particle conversion-gas exchange technique," Analytica Chimica Acta, vol. 891, Sep. 2015, pp. 73-78.

Ohata M e et al., "Direct analysis of gaseous mercury in ambient air by gas to particle conversion-gas exchange ICPMS," Journal of Analytical Atomic Spectrometry, vol. 32, No. 4, Apr. 2017 , pp. 1-32.

Y Suzuki et al., "Real-time monitoring and determination of Pb in a single airborne nanoparticle," Journal of Analytical Atomic Spectrometry, vol. 25, Jun. 4, 2010, pp. 947-949.

* cited by examiner

CALIBRATED PARTICLE ANALYSIS APPARATUS AND METHOD

CROSS-REFERENCE TO RELATED APPLICATION

This application claims the priority benefit of U.S. provisional application Ser. No. 62/618,637, filed on Jan. 18, 2018. The entirety of the above-mentioned patent application is hereby incorporated by reference herein and made a part of this specification.

1. TECHNICAL FIELD

This disclosure is related to a calibrated particle analysis apparatus and method.

2. BACKGROUND

Specialty gases (such as ammonia, hydrogen chloride, nitrogen trifluoride, carbon tetrafluoride, and etchants) and volatile organic solutions (such as isopropanol, acetone) are widely used in semiconductor processes, such as etching and cleaning processes. With the advancement of semiconductor process technology, from the past 14 nm to the current 7 nm to the future 5 nm process, the critical line width is constantly shrinking. In response to this trend, even a very small amount of pollution (such as particles, aerosols, transition metals, or heavy metals) may cause defects, such as short-circuiting, current leakage and pores. In the trend of decreasing line width of the semiconductor process and in order to maintain high product yield, semiconductor manufacturers need to confirm the particle contamination that may be encountered in each reagent (in electronics grade) used in each process step, and accurately analyzing the particle sizes is important in accurately controlling product yield and improve product quality.

However, the currently used liquid particle counter (LPC) cannot detect particles with a particle size of 20 nm or less. A particle analyzer, such as a scanning mobility particle sizer (SMPS) including a differential mobility analyzer (DMA) and a condensation particle counter (CPC), can detect particles having a particle size of 20 nm or less, but cannot directly analyze particles in volatile organic solutions or Specialty gases, because the volatile organic solutions and the Specialty gases will corrode the parts of the particle analyzer.

However, if the organic solutions and the Specialty gases entraining particles, even a very small amount of particles may fall on the treated surface of the object, and a yield loss is resulted.

Therefore, for a long time, whenever a semiconductor factory finds a yield loss of a product due to unknown reasons, only the replacement of raw materials of different production batches or even the replacement of different raw material suppliers can be relied, and thus batches of products are often scrapped. Hence, how to solve this problem is one of the important issues.

SUMMARY

In order to solve the problems above, some embodiments of this disclosure introduces a gas exchange device (GED) for gas exchange before the particle analyzer. The gas exchange device exchanges a special gas or a volatile organic substance in the sample with a carrier gas used by the particle analyzer. At the same time, the particles in the sample can be retained and transported to the particle analyzer for measuring various particle properties.

Accordingly, a calibrated particle analysis apparatus is provided. The calibrated particle analysis apparatus comprises a gas exchange device, a plurality of flow controllers, and a particle analyzer. The gas exchange device has a first end and a second end and includes an inner pipe and an outer pipe sleeving outside the inner pipe. The inner pipe has an inner gas inlet disposed at the first end, an inner gas outlet disposed at the second end, and a porous partition wall made from a porous material having properties of resistant to corrosion, non-reactive and not easily adhered to particles. The inner tube is provided to be an inner gas flow channel for circulation of a sample. The outer pipe has an outer gas inlet adjacent to the second end, an outer gas outlet adjacent to the first end, and an outer pipe wall made from a corrosion resistant material. A space between the inner pipe and the outer pipe is provided to be an outer gas flow channel for circulation of a carrier gas. A first flow controller, a second flow controller, and a third flow controller are respectively coupled to the inner gas inlet, the outer gas inlet, and the outer gas outlet. The particle analyzer coupled to the inner gas outlet for introducing particles in the sample carried by the carrier gas.

Accordingly, a calibrated particle analysis method is also provided. The calibrated particle analysis method uses the calibrated particle analysis apparatus above, and comprises the following steps. First, the first, second, and third flow controllers are closed. The second and third flow controllers are opened, so that the carrier gas is allowed to enter the outer gas flow channel from the outer gas inlet and leave the outer gas flow channel from the outer gas outlet. The first flow controller is opened, so that the sample is allowed to enter the inner gas flow channel from the inner gas inlet and leave the inner gas flow channel from the inner gas outlet, and gases of the sample is allowed to be exchanged with the carrier gas at the same time. Particles in the sample and carried by the carrier gas are introduced into the particle analyzer for performing particle analysis.

In light of the foregoing, a gas exchange device is disposed before the particle analyzer to replace the gas or volatile organic compounds in the sample to be tested by a carrier gas commonly used in particle analyzers. The apparatus and method can not only eliminate the deviation of the obtained analysis result caused by different gases or volatile organic substances in the sample to be tested. If the gas or volatile organic compounds in the sample to be tested are toxic or corrosive, it can also increase the safety of the analytical operation and extend the life of the particle analyzer.

The above described features and advantages of the present disclosure will be more apparent from the following description.

BRIEF DESCRIPTION OF THE DRAWINGS

The present disclosure can be more fully understood by reading the subsequent detailed description and examples with references made to the accompanying drawings, wherein.

DESCRIPTION OF THE EMBODIMENTS

Figure 1:
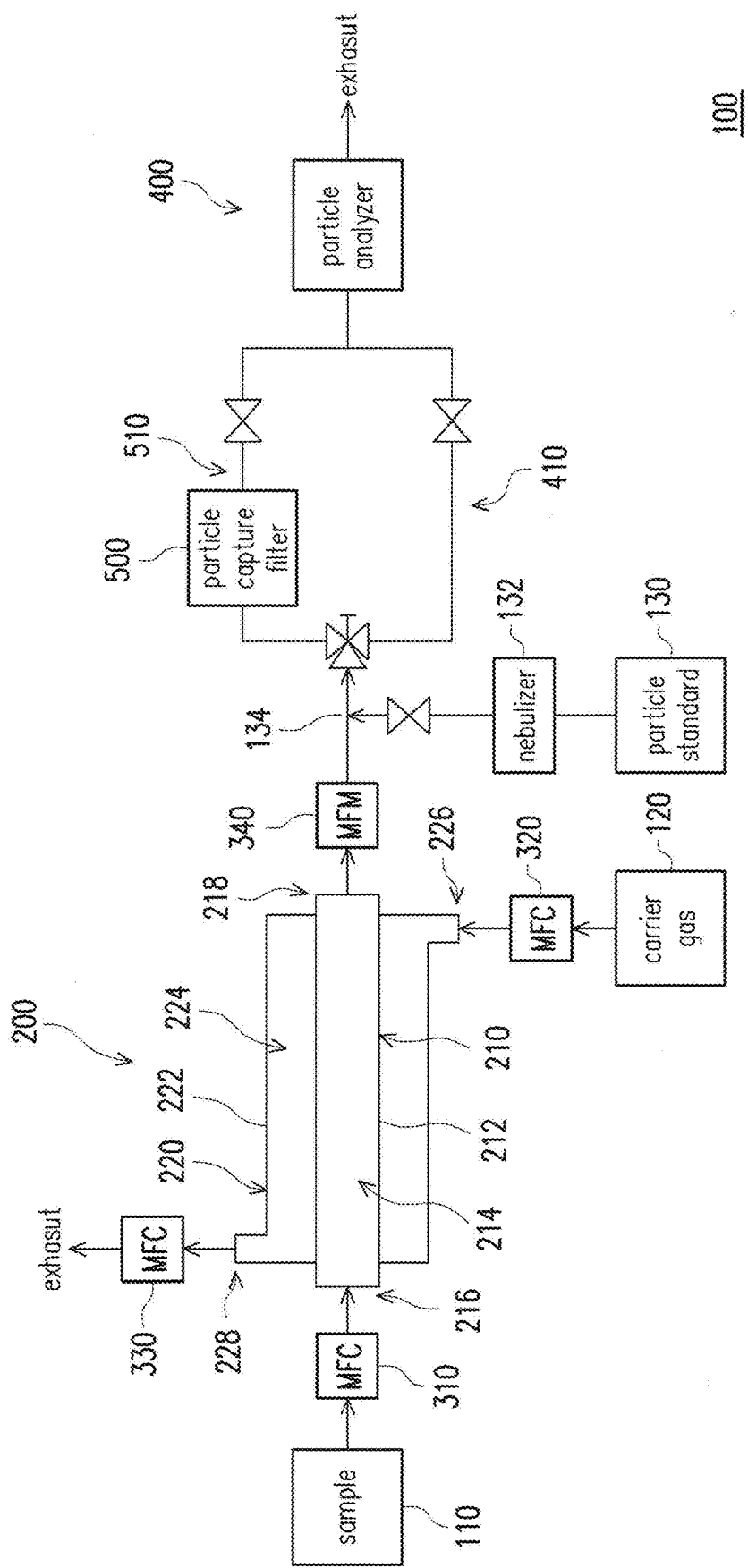
FIG. 1 is a schematic diagram of a calibrated particle analysis apparatus in accordance with some embodiments of the present disclosure.

Please refer to FIG. 1, which is a schematic diagram of a calibrated particle analysis apparatus in accordance with some embodiments of the present disclosure.

According to one embodiment, a calibrated particle analysis apparatus 100 has a gas exchange device 200, a first flow controller 310 coupled to the gas exchange device 200, and a second flow controller 320 and a third flow controller 330, and also has a particle analyzer 400 coupled to the gas exchange device 200.

The gas exchange device 200 described above has an inner pipe 210 and an outer pipe 220 that sleeves outside the inner tube 210. The inner gas flow channel 214 formed by the inner tube 210 is used to circulate a sample 110 to be analyzed, and the outer gas flow channel 224 formed by the gap between the inner tube 210 and the outer tube 220 is used to circulate a carrier gas 120.

The inner tube 210 described above is constituted by a porous partition wall 212 and has an inner gas inlet 216 and an inner gas outlet 218. The porous partition wall 212 is made of a material that is resistant to corrosion, non-reactive and not easily adhered by particles. The material may be, for example, polytetrafluoroethylene (PTFE). Moreover, the porous partition wall 212 has a porosity of 50-70% and an a pore diameter of about 200-500 nm for gas exchange.

In order to match the gas exchange capacity of the sample to more than 0.1 L/min and the gas exchange efficiency may reach 99% or more, the inner pipe 210 may have an inner diameter of, for example, 1 to 30 mm, and the inner pipe 210 may have a length of at least 10 cm and can be, for example, 10-300 cm. In addition, the shape of the gas exchange device 200 is not limited to the straight tubular shape shown in FIG. 1, and may be various curved tubular shapes, such as a spiral curved pipe, to increase the length of the gas exchange pipe in a limited space to achieve better gas exchange efficiency.

The outer pipe 220 is constituted by an outer pipe wall 222 and has an outer gas inlet 226 and an outer gas outlet 228. The outer pipe wall 224 is made of a corrosion-resistant and air-tight material, such as stainless steel or Telfon, to prevent leakage of toxic or corrosive gases in the inner pipe 210. Further, the inner diameter of the outer pipe 220 is not particularly limited as long as it can accommodate the inner pipe 210.

The first flow controller 310 is coupled to the inner gas inlet 216 to control the gas inflow rate of the sample 110 at the inner gas inlet 216. The above sample 110 contains various common Specialty gases and various volatile liquid raw materials used in the semiconductor factories. The Specialty gases comprise may be, for example, $NH_3$, HCl, $NF_3$, $CO_2$, $N_2O$, $BF_3$, $AsH_3$, $PH_3$, $GeH_4$, $CF_4$, HF, or the like. The above volatile liquid raw materials may be, for example, isopropyl alcohol, some slurries, and hydrogen peroxide.

Therefore, if the sample 110 is a liquid sample, it will pass through a nebulizer (not shown in the figure), and the particles in the liquid sample will form a dry aerosol before passing through the gas pipeline (not shown in the figure) and the first flow controller 310 to be delivered into the inner pipe 210 of the gas exchange device 200.

The second flow controller 320 is coupled to the outer gas inlet 226 to control the gas inflow rate of the carrier gas 120 at the outer gas inlet 226. The carrier gas 120 described above may be, for example, nitrogen or air. The third flow controller 330 is coupled to the outer gas outlet 228 described above, so that the gas outflow rate of the outer gas flow channel 224 can be controlled. Therefore, the second flow controller 320 and the third flow controller 330 cooperate to control the gas flow rate of the outer gas flow channel 224. In addition, after the third flow controller 330, an air pump (not shown) may be configured to increase the exhaust efficiency at the outer gas outlet 228.

The first flow controller 310, the second flow controller 320, and the third flow controller 330 may be independently a mass flow controller, a rotameter, an orifice flow meter, an ultrasonic flowmeter, a flow-limiting valve, a needle valve, or other available flow controllers.

The particle analyzer 400 described above can be used to analyze various properties of particles in a sample, such as particle size, particle concentration, or chemical composition of the particles, and the like. At present, the common particle analyzer 400 has, for example, a scanning mobility particle sizer (SMPS), a condensation particle counter (CPC), an optical particle counter (OPC), an optical particle sizer (OPS), or an aerodynamic particle sizer (APS).

Therefore, a method of using the above-described calibrated particle analysis apparatus 100 is as follows. First, it is made sure that the first flow controller 310, the second flow controller 320, and the third flow controller 330 are closed. Then, the second flow controller 320 and the third flow controller 330 are opened, and the carrier gas 120 enters the outer gas flow channel 224 from the outer gas inlet 226 and exits the outer gas flow channel 224 from the outer gas outlet 228.

Next, the first flow controller 310 is opened to let the sample 110 enter the inner gas flow channel 214 from the inner gas inlet 216 and leave the inner gas flow channel 214 from the inner gas outlet 218. At the same time, the carrier gas 120 will exchange with the gases in the sample 110, and then the mixed gas of gases in the sample 110 and the carrier gas 120 is exhausted from the outer gas outlet 228. The carrier gas 120 then carries the particles from the sample 110 into the particle analyzer 400 for performing analysis.

According to another embodiment, the calibrated particle analysis apparatus 100 may further include a flowmeter 340 disposed between the inner gas outlet 218 and the particle analyzer 400 and coupled to the inner gas outlet 218 and the particle analyzer 400. Therefore, after the carrier gas 120 carries the particles in the sample 110 from the inner gas outlet 218 of the inner gas flow channel 214, the particles and the carrier gas 120 can pass through the flowmeter 340 and then entering the particle analyzer 400 for analysis. The flowmeter 340 is used to monitor the gas inflow rate of the particle analyzer 400. If the gas inflow rate of the particle analyzer 400 is greater than or equal to the gas inflow rate of the sample 110 at the inner gas inlet 216, indicating that the particles in the sample 110 are not lost, all of the particles may enter the particle analyzer 400 for analysis.

According to still another embodiment, the calibrated particle analysis apparatus 100 may further include a nebulizer 132 coupled to an inlet conduit of the particle analyzer 400 through the particle standard inlet 134. The nebulizer 132 is used to generate the particle standard 130 to mix the standard particles having known particle size and concentration in the particle standard 130 with the particles in the sample 110 in the gas pipeline. Then, the mixture is introduced into the particle analyzer 400 to perform analysis by using the standard particles as the internal standard. Commonly used standard particles include polystyrene particles of different particle sizes, for example.

According to still another embodiment, the calibrated particle analysis apparatus 100 may further include a particle capture filter 500. In FIG. 1, two gas paths are disposed between the flowmeter 340 and the particle analyzer 400. The first path 410 only has an empty pipe and a switch, and the second path 510 has a particle capture filter 500 in addition to the empty pipe and the switch. Therefore, when the analysis is performed, it is possible to select whether the particles in the sample 110 are to pass through the particle capture filter 500 or not. If the particle capture filter 500 is selected to be passed through, the particles in sample 110 will remain in particle capture filter 500.

After a period of accumulation, the particles left in the particle capture filter 500 can be sampled for other qualitative and quantitative analysis, such as scanning electron microscope (SEM) that can detect particle size, Energy-dispersive X-ray spectroscopy (EDS) that can analyze the particle composition, or inductively coupled plasma mass spectrometry (ICP-MS) that can analyze metal elements.

In order to eliminate the deviation of the analytical results caused by different gases or volatile organic compounds in the sample, and increase the safety of the analysis operation and prolong the service life of the particle analyzer, some examples are given for testing the gas exchange efficiency of the above gas exchange device.

Example 1: Effect of Flow Rate Ratio of Carrier Gas and Sample on Gas Exchange Efficiency The gas exchange efficiency test uses nitrogen as the carrier gas. The residual concentration of the tested gas after gas exchange by the gas exchange device is detected by Fourier-transformation infrared spectroscopy (FTIR). The calculation formula of gas exchange efficiency E is as follows:

$$E = \frac{\text{initial concentration of sample} - \text{residual concentration of sample}}{\text{initial concentration of sample}} \times 100\%$$

In this experimental example, the flow rate of the gas as the sample was fixed at 1 L/min, and then the flow rate of nitrogen as the carrier gas was changed, and the influence of the ratio of the carrier gas flow rate/sample flow rate on the gas exchange efficiency was tested. In addition, the gas used as sample has $NH_3$, $N_2O$, $CO_2$, $NF_3$, and $CF_4$ to test whether the gas exchange efficiency will vary depending on the various gas. The relevant parameters of the above several gases are listed in Table 1, and the results obtained are shown in FIG. 2.

TABLE 1

| Specialty gases | Flow rate of carrier gas (L/min) | Gas exchange efficiency (%) |
| --- | --- | --- |
| $NH_3$ | 2 | 99.99 |
| $CO_2$ | 4 | 99.99 |
| $N_2O$ | 4 | 99.99 |
| $NF_3$ | 5 | 99.99 |
| $CF_4$ | 6 | 99.99 |

Figure 2:
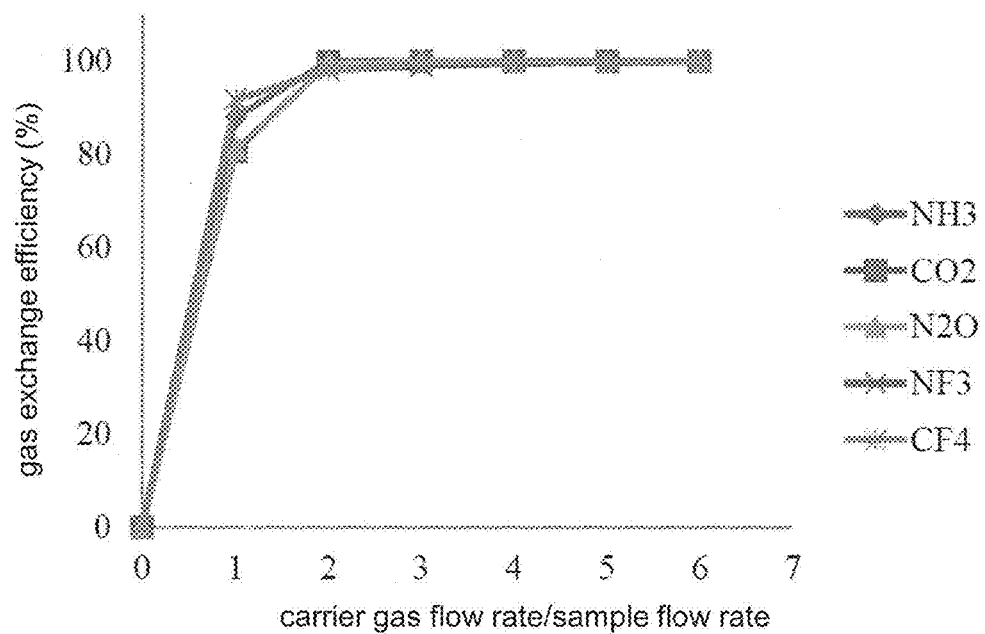
FIG. 2 shows the effect of the ratio of the flow rate of the carrier gas to the sample to be tested on the gas exchange efficiency.

In FIG. 2, it can be seen that the gas exchange efficiency of different gases is basically not much different when the carrier gas flow rate is increased to a certain value. In addition, when the ratio of carrier gas flow rate/sample flow rate is equal to 1, the gas exchange efficiency of these gases is greater than 80%. When the ratio of carrier gas flow rate/sample flow rate is equal to 2, the gas exchange efficiency of these gases is greater than 99%. When the ratio of carrier gas flowrate/sample flow rate is equal to 6, the gas exchange efficiency of these gases is greater than 99.99%.

Example 2: Effect of Particle Size on Particle Transport Efficiency

In order to ensure the particle loss in the sample when the gas exchange efficiency is 99% or more, an example is given to test the particle transport efficiency of the above gas exchange device. The formula for particle transport efficiency T is as follows:

$$T = \frac{\text{residual concentration of particles}}{\text{initial concentration of particles}} \times 100\%$$

In this experimental example, the particle size was changed to test its effect on particle transport efficiency. The particles used herein are polystyrene particles with particle sizes of 60 nm, 100 nm, 300 nm, and 500 nm, respectively. Other test conditions are as described above. The sample of the particle transport efficiency test is a carrier gas carrying polystyrene particles with a flow rate of 1 L/min. The carrier gas is nitrogen and has a flow rate of 4 L/min. The results obtained are shown in Table 2. As can be seen from Table 2, the particle transfer efficiency is almost 100%.

TABLE 2

| Particle diameter (nm) | Particle transport efficiency (%) |
| --- | --- |
| 60 | 98 ± 11 |
| 100 | 100 ± 11 |
| 300 | 100 ± 10 |
| 500 | 100 ± 10 |

From the test results of the above experimental examples, the specifications of the gas exchange device used in the following experimental examples are as follows. The inner pipe is made of porous polytetrafluoroethylene (PTFE) material and the gas exchange devices can handle samples with a flow rate of 1 L/min and the obtained gas exchange efficiency was 99.99% or more. Next, the gas exchange device was placed in a calibrated particle analysis apparatus as shown in FIG. 1, and a particle analysis experiment was performed. In the following experimental example, the particle analyzer is a scanning mobility particle sizer (SMPS) including a differential mobility analyzer (DMA) and a condensation particle counter (CPC).

Example 3: Effect of Particle Exchange Analysis (GED) Before and after Calibration on Particle Analysis Results In this example, polystyrene particles with particle sizes of 100 nm and 300 nm were respectively used, and particle analysis results before and after calibration using gas exchange device were compared. The polystyrene particles are transported by argon into the inner pipe of the gas exchange device, and the carrier gas in the outer pipe is nitrogen. The results obtained for the 100 nm and 300 nm polystyrene particles are shown in FIGS. 3A-3B and FIGS. 4A-4B, respectively.

Figure 3A:
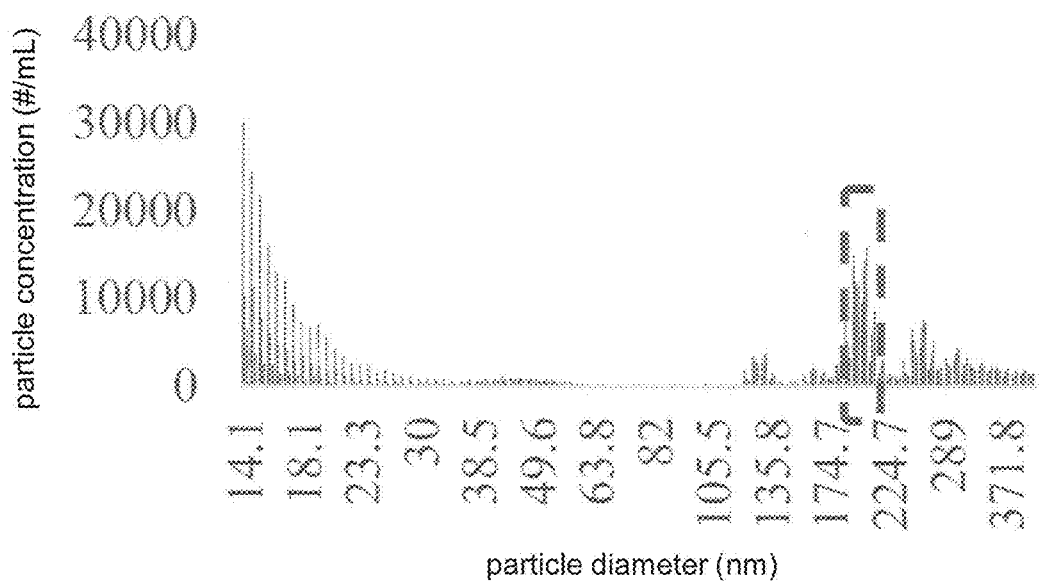
FIG. 3A shows a particle size distribution diagram of the obtained 100 nm polystyrene particles carried by argon.
Figure 3B:
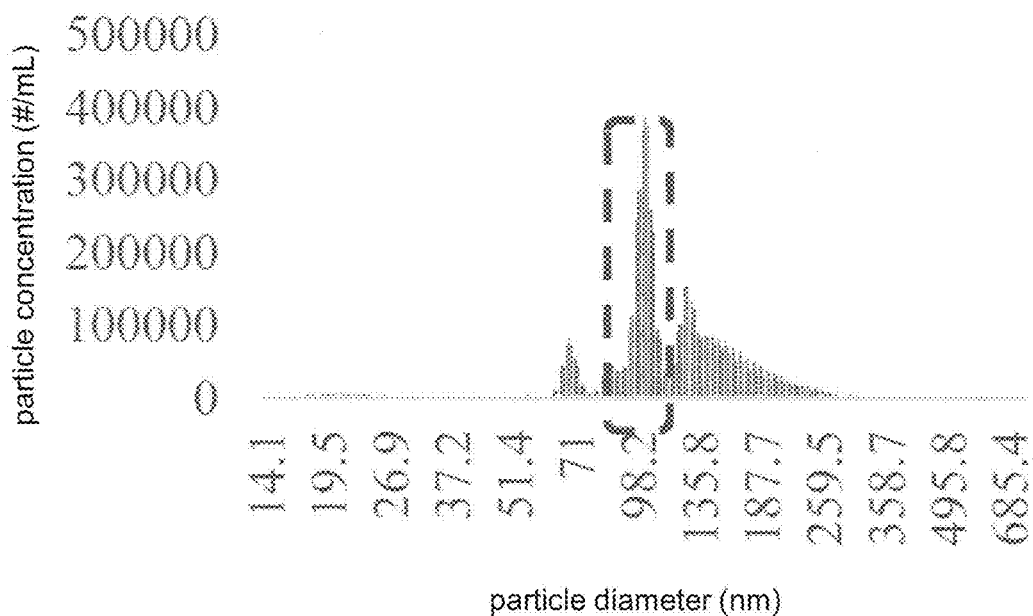
FIG. 3B shows a particle size distribution diagram of the obtained 100 nm polystyrene particles carried by nitrogen after gas exchange.

The comparison results of 100 nm polystyrene particles are looked at first. FIG. 3A shows the analysis results of particle size and particle concentration without using the gas exchange device, and FIG. 3B shows the analysis results of particle size and particle concentration after removal of argon by nitrogen using a gas exchange device. FIG. 3A shows that the peak of the particle size distribution using argon as the carrier gas before gas exchange is at 202 nm, FIG. 3B shows that the peak of the particle size distribution using nitrogen as the carrier gas after gas exchange is at 102 nm, which is very close to the actual particle size of 100 nm.

Figure 4A:
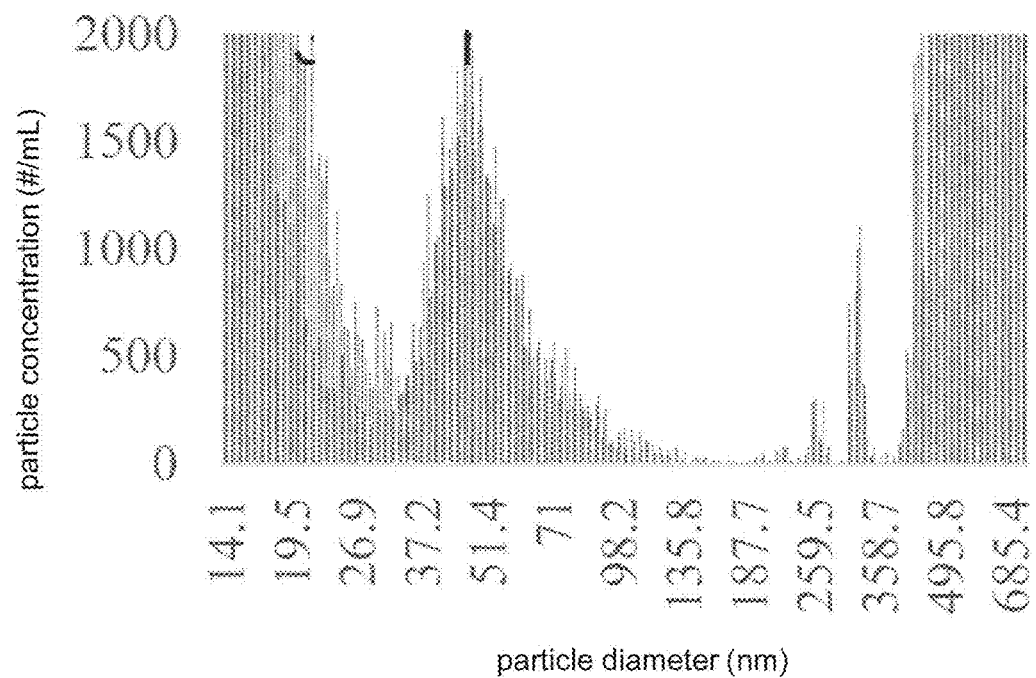
FIG. 4A shows a particle size distribution diagram of the obtained 300 nm polystyrene particles carried by argon.
Figure 4B:
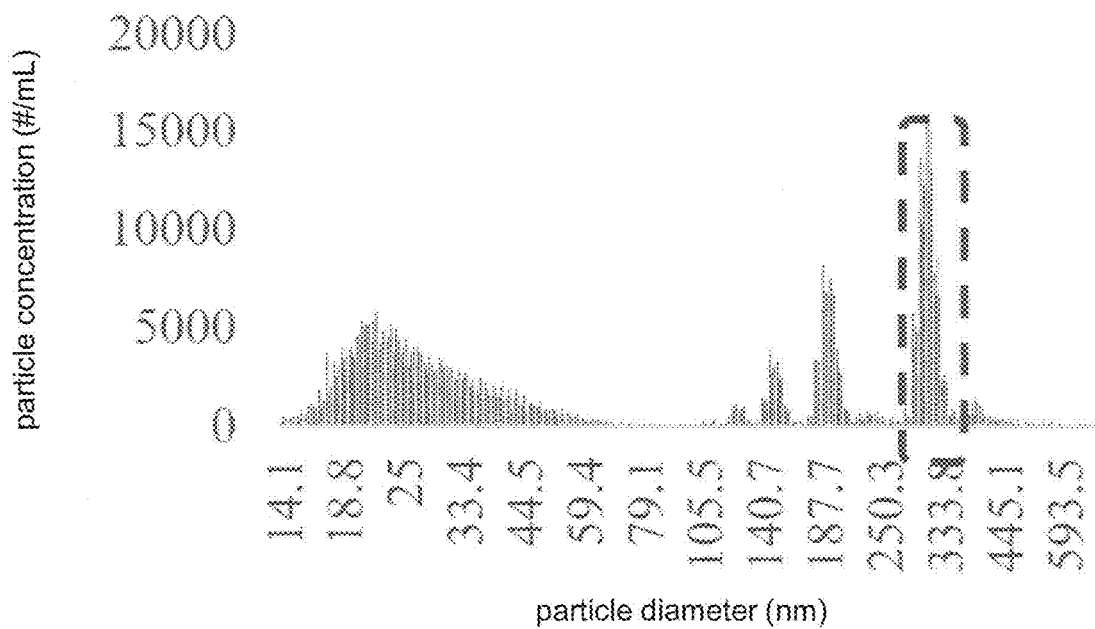
FIG. 4B shows a particle size distribution diagram of the obtained 300 nm polystyrene particles carried by nitrogen after gas exchange.

The comparison results of 300 nm polystyrene particles are looked at next. FIG. 4A shows the analysis results of the particle size and particle concentration without using the gas exchange device, and FIG. 4B shows the analysis results of particle size and particle concentration after removal of argon by nitrogen using a gas exchange device. FIG. 4A shows that the peak of the particle size distribution using argon as the carrier gas before gas exchange is at 188 nm, FIG. 4B shows that the peak of the particle size distribution using nitrogen as the carrier gas after gas exchange is at 322 nm, which is very close to the actual particle size of 300 nm. In addition, when the SMPS scans to a large particle size, it is also found that an electric arc is generated in the SMPS, which causes the SMPS to misjudge the particle concentration. When the gas exchange device is connected to the front end of the SMPS, the original argon gas is replaced by nitrogen gas, which can eliminate the problem of particle size shift and arc phenomenon caused by argon gas.

Example 4: Adding a Particle Capture Filter to the Calibrated Particle Analysis Apparatus As shown in FIG. 1, a particle capture filter 500 can be disposed between the gas exchange device 200 and the particle analyzer 400.

Therefore, between the gas exchange device 200 and the particle analyzer 400, there are two gas passages can be chosen. One is the first path 410, which is only an empty tube to allow the analytical sample to directly enter the particle analyzer 400. The other one is a second path 510 configured with a particle capture filter 500. The analysis sample first passes through the particle capture filter 500 and then enters the particle analyzer 400.

In this example, sample is a mixture of ammonia and particles, and the carrier gas is nitrogen. The analysis results using the above two paths are shown in FIGS. 5A-5C.

Figure 5A:
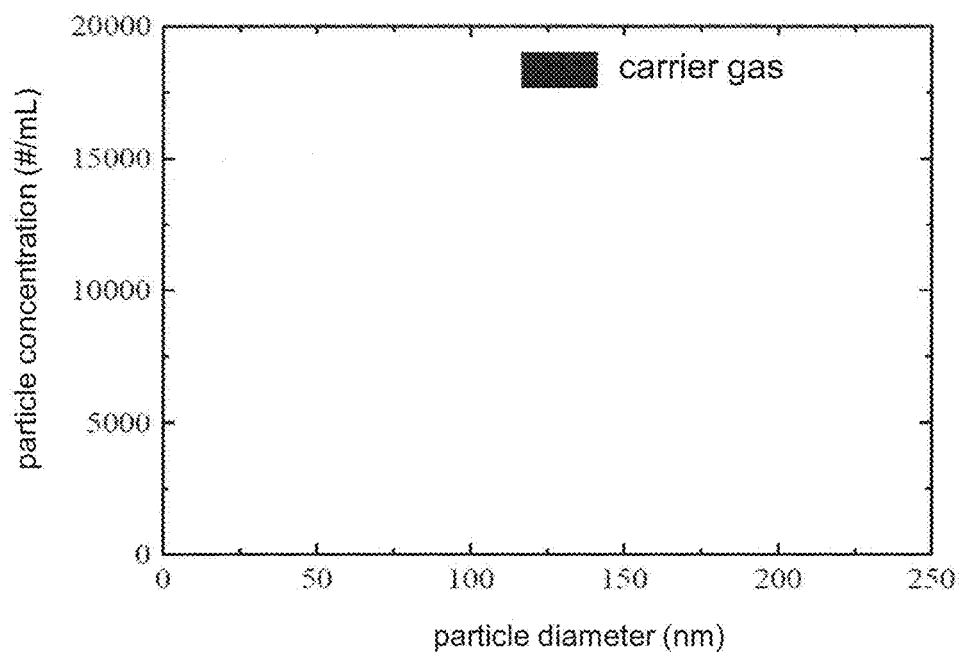
FIG. 5A shows a particle size distribution diagram of the carrier gas without passing through the particle capture filter.

FIG. 5A shows a particle size distribution diagram of a carrier gas without passing through the particle capture filter. From FIG. 5, it can be known that the carrier gas used does not contain any particles at all, indicating that the background generated by the carrier gas in the particle size distribution diagram is zero.

Figure 5B:
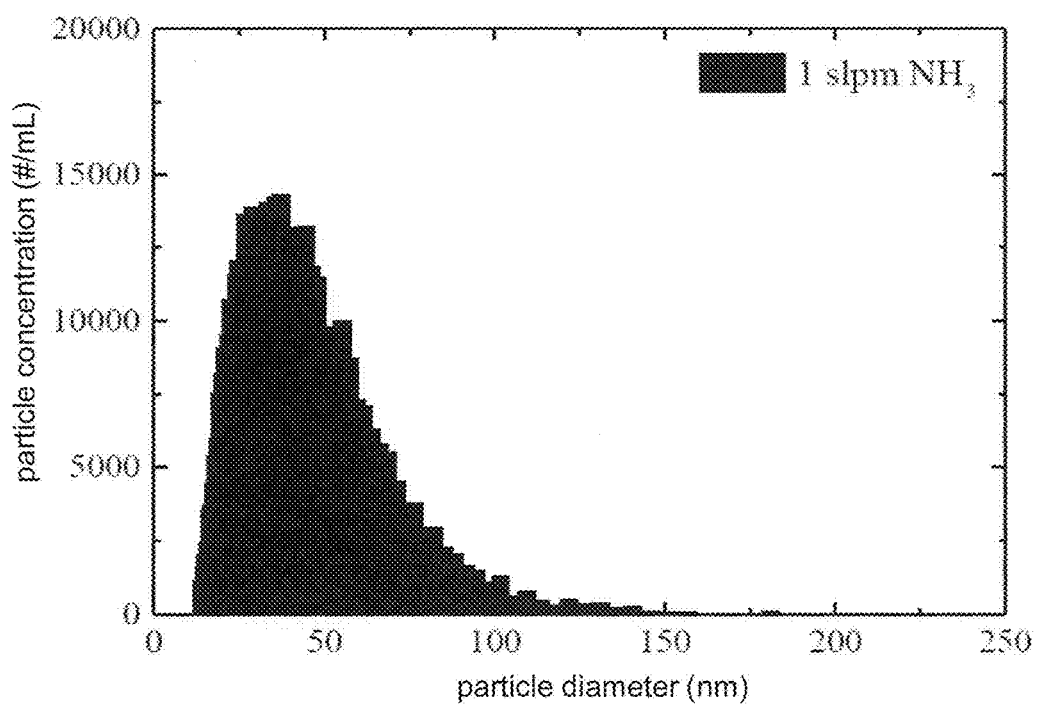
FIG. 5B shows a particle size distribution diagram of the sample without passing through the particle capture filter.
Figure 5C:
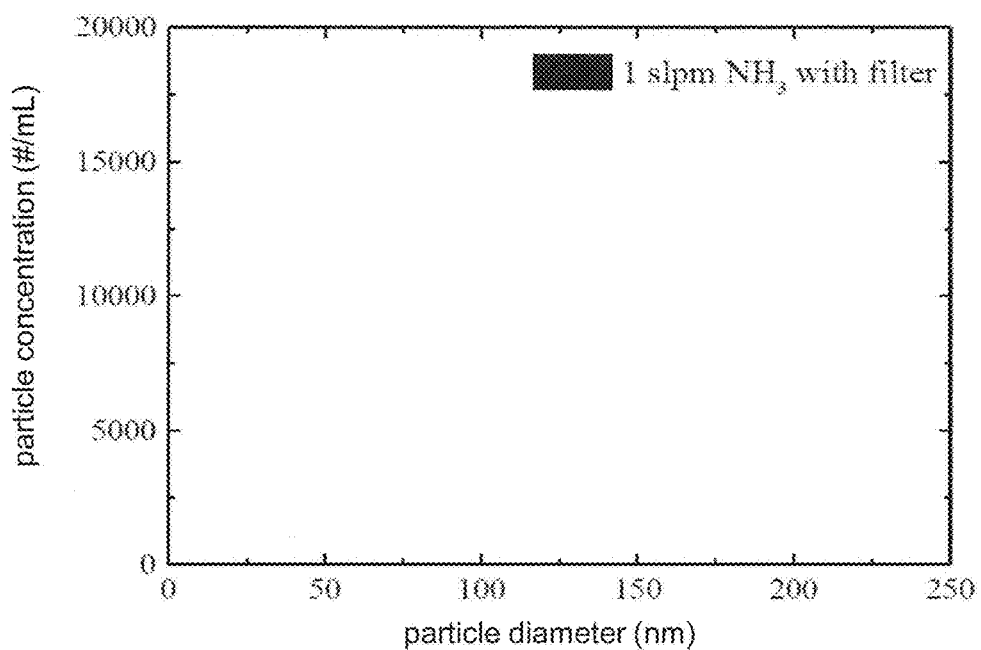
FIG. 5C shows a particle size distribution diagram of the sample after passing through the particle capture filter.

FIG. 5B shows a particle size distribution diagram of the sample without passing through the particle capture filter. FIG. 5C shows a particle size distribution diagram of the sample after passing through the particle capture filter. Comparing FIGS. 5B and 5C, it can be seen that the particle size distribution results shown in FIG. 5B are all from sample, and the residual gas concentration has no effect on the particle analyzer because no particles are detected in FIG. 5C obtained after passing through the particle capture filter.

Example 5: Adding an Input of Particle Standard to the Calibrated Particle Analysis Apparatus As shown in FIG. 1, between the gas exchange device 200 and the particle analyzer 400, the particle standard 130 can be passed through the nebulizer 132 and then mixed with the sample 110 as an internal standard. Subsequently, the mixture is directed into the particle analyzer 400 for analysis.

Figure 6A:
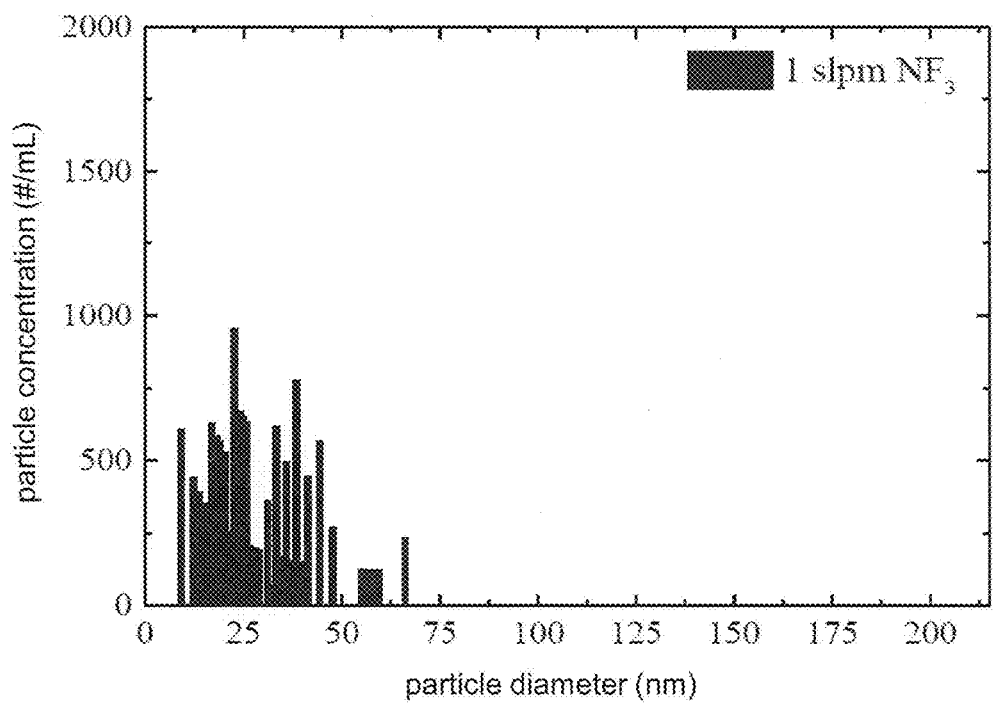
FIG. 6A shows a particle size distribution diagram of a sample.
Figure 6B:
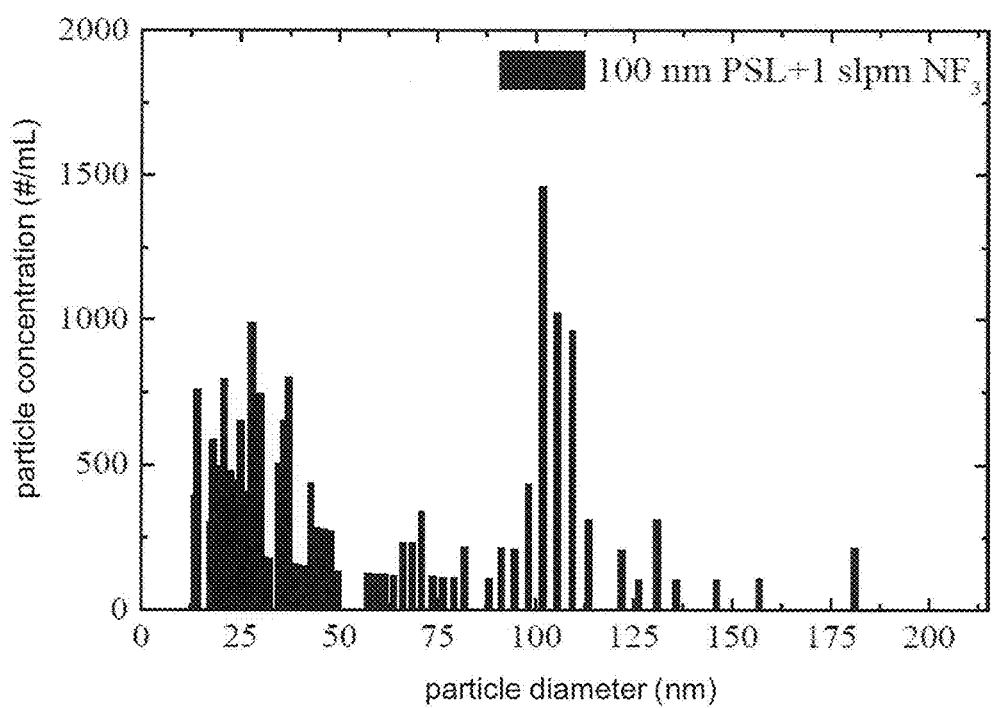
FIG. 6B shows a particle size distribution diagram of the sample and the particle standard after mixing.

In this example, the sample is $NF_3$ pure gas with a flow rate of 1 L/min. The carrier gas is nitrogen with a flow rate of 6 L/min. The results of the analysis using the above-mentioned added particle standard are shown in FIGS. 6A-6B. FIG. 6A shows a particle size distribution diagram of a sample. FIG. 6A shows that the particle size in the sample to be tested is below 70 nm and the peak value is 25 nm.

In order to avoid interference with the sample analysis, polystyrene particles with a particle size of 100 nm may be selected, so that the particle size distribution of the particle standard does not overlap with the particle size distribution of the sample. FIG. 6B shows the particle size distribution after mixing sample and particle standard. In FIG. 6B, peaks respectively appears at 25 nm and 100 nm.

In summary, a gas exchange device is disposed before the particle analyzer to replace the gas or volatile organic compounds in the sample with the carrier gas commonly used by the particle analyzer. The apparatus and method can not only eliminate the deviation of the obtained analysis result caused by different gases or volatile organic substances in the sample to be tested. If the gas or volatile organic compounds in the sample to be tested are toxic or corrosive, it can also increase the safety of the analytical operation and extend the life of the particle analyzer.

Although the present disclosure has been disclosed in the above embodiments, it is not intended to limit the present disclosure. Those skilled in the art can make some modifications and refinements without departing from the spirit and scope of the present disclosure. Hence. the scope of the disclosure is defined by the scope of the appended claims.

What is claimed is:

1. A calibrated particle analysis apparatus, comprising:
a gas exchange device having a first end and a second end, the gas exchange device comprising:
an inner pipe having an inner gas inlet disposed at the first end, an inner gas outlet disposed at the second end, and a porous partition wall made from a porous material having properties of resistant to corrosion and non-reactive; and
an outer pipe sleeving outside the inner pipe and having an outer gas inlet adjacent to the second end, an outer gas outlet adjacent to the first end, and
an outer pipe wall made from a corrosion resistant material;

a first flow controller coupled to the inner gas inlet;
a second flow controller coupled to the outer gas inlet;
a third flow controller coupled to the outer gas outlet;
a particle analyzer coupled to the inner gas outlet for introducing particles in a sample carried by a carrier gas; and
a flowmeter disposed between the inner gas outlet and the particle analyzer and coupled to the inner gas outlet and the particle analyzer.

2. The apparatus of claim 1, wherein the inner pipe has an inner diameter of 1 to 30 mm and a length of 10 to 300 cm.

3. The apparatus of claim 1, wherein the first, second, and third flow controllers respectively comprise a mass flow controller, a rotameter, an orifice flow meter, an ultrasonic flowmeter, a flow-limiting valve, or a needle valve.

4. The apparatus of claim 1, wherein the particle analyzer comprises a scanning mobility particle sizer (SMPS), a condensation particle counter (CPC), an optical particle counter (OPC) an optical particle sizer (OPS) or an aerodynamic particle sizer (APS).

5. The apparatus of claim 1, further comprising a particle capture filter disposed between the flowmeter and the particle analyzer and coupled to the flowmeter and the particle analyzer.

6. The apparatus of claim 1, further comprising a particle standard inlet disposed between the flowmeter and the particle analyzer and coupled to the flowmeter and the particle analyzer.

7. The apparatus of claim 1, further comprising a particle capture filter disposed between the inner gas outlet and the particle analyzer and coupled to the inner gas outlet and the particle analyzer.

8. The apparatus of claim 1, further comprising a particle standard inlet disposed between the inner gas outlet and the particle analyzer and coupled to the inner gas outlet and the particle analyzer.

9. A calibrated particle analysis method, the method comprising:
providing a calibrated particle analysis apparatus, the apparatus comprising:
a gas exchange device having a first end and a second end, the gas exchange device comprising:
an inner pipe having an inner gas inlet disposed at the first end, an inner gas outlet disposed at the second end, and a porous partition wall made from a porous material having properties of resistant to corrosion and non-reactive, wherein the inner tube is provided to be an inner gas flow channel for circulation of a sample; and
an outer pipe sleeving outside the inner pipe and having an outer gas inlet adjacent to the second end, an outer gas outlet adjacent to the first end, and an outer pipe wall made from a corrosion resistant material, wherein a space between the inner pipe and the outer pipe is provided to be an outer gas flow channel for circulation of a carrier gas;
a first flow controller coupled to the inner gas inlet;
a second flow controller coupled to the outer gas inlet;
a third flow controller coupled to the outer gas outlet; and
a particle analyzer coupled to the inner gas outlet for introducing particles in the sample carried by the carrier gas;
closing the first, second, and third flow controllers;
opening the second and third flow controllers, so that the carrier gas is allowed to enter the outer gas flow channel from the outer gas inlet and leave the outer gas flow channel from the outer gas outlet;
opening the first flow controller, so that the sample is allowed to enter the inner gas flow channel from the inner gas inlet and leave the inner gas flow channel from the inner gas outlet, and gases of the sample is allowed to be exchanged with the carrier gas at the same time;
monitoring a gas outflow rate of the inner gas flow channel using a flowmeter disposed between the inner gas outlet and the particle analyzer;
controlling the gas inflow rate of the inner gas flow channel by using the first flow controller, such that the gas inflow rate is greater than or equal to the gas outflow rate to avoid particle loss; and
introducing particles in the sample and carried by the carrier gas into the particle analyzer for performing particle analysis.

10. The method of claim 9, further comprising:
introducing a particle standard through a particle standard inlet disposed between the flowmeter and the particle analyzer; and
introducing the particle standard and the sample into the particle analyzer at the same time, so that the particle standard is used as an internal standard when the sample is analyzed.

11. The method of claim 9, further comprising:
intercepting particles in the sample by using a particle capture filter disposed between the flowmeter and the particle analyzer.

12. The method of claim 9, further comprising:
introducing a particle standard through a particle standard inlet disposed between the flowmeter and the particle analyzer; and
introducing the particle standard and the sample into the particle analyzer at the same time, so that the particle standard is used as an internal standard when the sample is analyzed.

13. The method of claim 9, further comprising:
intercepting particles in the sample by using a particle capture filter disposed between the flowmeter and the particle analyzer.

14. The method of claim 9, wherein the inner pipe has an inner diameter of 1 to 30 mm and a length of 10 to 300 cm.

15. The method of claim 9, wherein the first, second, and third flow controllers respectively comprises a mass flow controller, a rotameter, an orifice flow meter, an ultrasonic flowmeter, a flow-limiting valve, or a needle valve.

16. The method of claim 9, wherein the particle analyzer comprises a scanning mobility particle sizer (SMPS), a condensation particle counter (CPC), an optical particle counter (OPC), an optical particle sizer (OPS), or an aerodynamic particle sizer (APS).

* * * * *